United States Patent [19]

Donner

[11] Patent Number: 5,149,933

[45] Date of Patent: Sep. 22, 1992

[54] WELDING CONTROL

[75] Inventor: Joseph E. Donner, Vista, Calif.

[73] Assignee: Hughes Aircraft Company, Los Angeles, Calif.

[21] Appl. No.: 811,201

[22] Filed: Dec. 20, 1991

[51] Int. Cl.$^5$ .............................................. B23K 11/26
[52] U.S. Cl. .................................... 219/113; 219/110; 320/1
[58] Field of Search ...................... 219/110, 113; 320/1

[56] References Cited

U.S. PATENT DOCUMENTS

| | | | |
|---|---|---|---|
| 3,394,240 | 7/1968 | Broomhall | 219/113 |
| 3,436,514 | 4/1969 | Broomhall et al. | 219/113 |
| 4,182,949 | 1/1980 | Powers et al. | 219/113 |
| 4,228,340 | 10/1980 | Dufrenne | 219/113 |
| 4,785,159 | 11/1988 | Hruska | 219/113 |
| 4,965,860 | 10/1990 | Jochi | 219/113 |

*Primary Examiner*—Clifford C. Shaw

*Attorney, Agent, or Firm*—Jeannette M. Walder; Wanda K. Denson-Low

[57] ABSTRACT

Voltage stored in a capacitor bank (12) of a capacitor discharge welding apparatus is modified in accordance with the magnitude of output energy actually delivered to the weld. After empirically determining capacitor bank voltage and output energy emloyed in the making of an acceptable weld, energy delivered to subsequent welds is monitored (50,56). An efficiency factor based upon stored voltage and delivered energy of the prior weld is determined. Based upon this efficiency factor and the output energy delivered during the prior weld, a new value of capacitor voltage is calculated for use in a subsequent weld. Regulation of the voltage on the capacitor bank (12) is determined by a feedback circuit which senses capacitor bank voltage, compares it to a set point, and shuts down a boost charging circuit when capacitor voltage has reached a predetermined amount.

17 Claims, 2 Drawing Sheets

WELDING CONTROL

BACKGROUND OF THE INVENTION

1. Field of the Invention

The present invention relates to capacitor discharge welding, and more particularly concerns control of stored voltage and delivered output energy in such welding.

2. Description of Related Art

In capacitor discharge welding, voltage on a capacitor bank is established in order to enable a selected amount of output energy to be delivered to the weld. After loss of energy in the weld transformer, weld head, weld cables and with some leakage from the capacitor, energy actually delivered to the weld site should be sufficient to perform the desired welding operation in an optimum manner. However, as successive welds are made, energy losses and capacitor storage capacity change. When capacitors heat up their storage capacity may change by as much as 50% to 100%. This is particularly true of electrolytic capacitors. Losses in primary and secondary windings of the weld transformer change significantly as resistance of the transformer changes with increased temperature. So, too, the very large diameter weld cables on the weld head itself exhibit resistance increases of as much as 25% as a series of welds is made and the welding apparatus temperature increases.

Further contributing to the problem is the fact that with each successive weld, new parts to be welded are introduced. The new parts are at a lower temperature, not having had a chance to become heated as have the various parts of the welding apparatus. Thus, resistance of the welding parts, which are effectively at a constant relatively low temperature, has a constant resistance value, and the proportions of energy dissipated in the various parts of the apparatus will vary as welding component temperature (not temperature of parts) increases. Increased resistance of the various parts without change in the capacitor bank voltage reduces weld current and degrades the welds being made.

Still further, as the capacitor bank increases in temperature, its capacitance value changes drastically. As is well known, for a constant voltage the amount of stored energy changes in proportion to capacitance. With changes in stored energy and changes in distribution losses through the transformer, weld cables, weld head and the like, there is poor control of the overall weld process.

Another problem manifested in capacitor discharge welding is precision control of a selected capacitor bank voltage. This problem results in part from difficulties in control of the capacitor bank charging circuit. Where silicon control rectifiers (SCR's) are employed as switching devices for charge control, precision shut off of charging current may not be directly available. Charging circuits of this type may employ full wave rectified current through the SCR, which cannot be shut off until current goes to zero. Accordingly, if voltage of the capacitor bank being charged should reach its desired value at a point in the full wave rectified wave form that is not at zero, charging must continue until the wave form reaches its zero value.

To avoid this excessive charge it has been suggested that the charging current be diverted from the capacitor bank when the voltage on the latter has reached its chosen value. Although this arrangement will enable increased precision of control of the voltage on the capacitor bank, the diverted current is wasted and the apparatus is energy inefficient. Moreover, such SCR switched capacitor chargers have an inefficient power factor in that current flows during only 30° to 40° of each 180° of line voltage, and thus the power line current is not used with optimum efficiency. The SCR arrangement effectively draws current, when used with a full wave rectifier for example, during only 2 to 3 milliseconds for each half cycle of line current and fails to utilize the full 8.3 milliseconds for each half cycle that are available.

Accordingly, it is an object of the present invention to provide welding control that avoids or minimizes above mentioned problems.

SUMMARY OF THE INVENTION

In carrying out principles of the present invention in accordance with a preferred embodiment thereof, electrical energy is delivered to a welding head by empirically determining storage device voltage and energy delivered to a weld site upon the making of an acceptable weld, making a subsequent (useful) weld with the empirically determined parameters, measuring output energy delivered during said subsequent weld, and establishing a new value of storage device voltage for a second subsequent weld based upon the measured energy of the prior weld. More specifically, set point efficiency coefficient K is determined on the basis of voltage stored in the capacitor bank and output energy actually delivered during the acceptable weld. Voltage for the next weld is established based upon the calculated set point efficiency coefficient and the measured output energy delivered during the prior weld.

According to another feature of the invention, precision regulation of capacitor bank voltage is accomplished by establishing a voltage set point for capacitor bank voltage and employing the voltage set point to control a charging device so as to stop charging when the capacitor bank voltage has a predetermined relation to the voltage set point. According to still another feature of the invention, a power factor corrected boost regulator is employed that enables precision shutdown of the charging when the voltage set point has been reached, thereby avoiding waste of shunted current.

DESCRIPTION OF THE PREFERRED EMBODIMENTS

Figure 1:
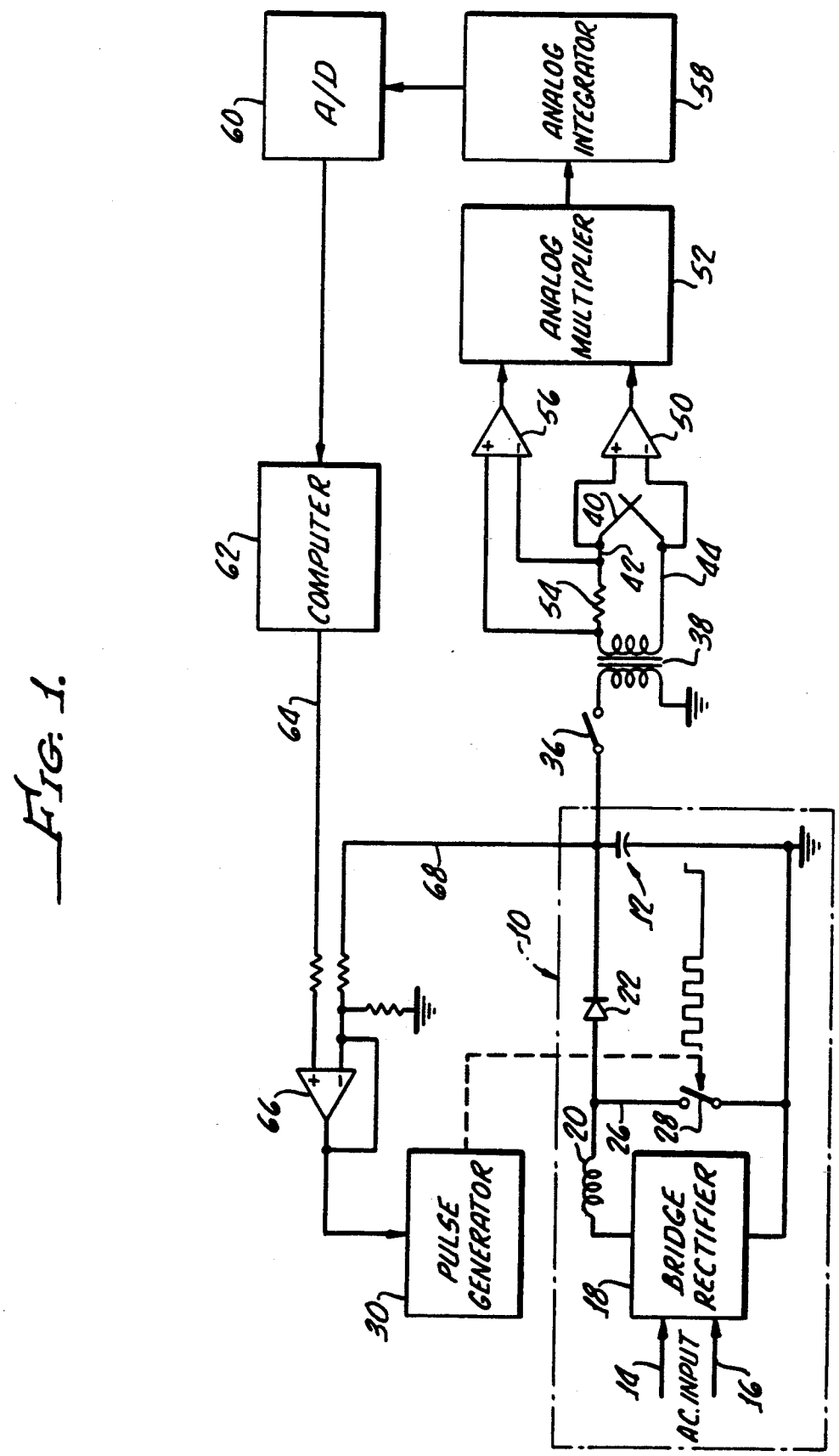
FIG. 1 illustrates an exemplary capacitor discharge welding control circuit including arrangements for controlling energy delivered to the weld site.

A simplified diagram of a capacitor discharge welding circuit as shown in FIG. 1 employs a charging circuit that is shown in generalized form as a boost regulator 10. The circuit charges a capacitor storage bank 12 from AC line current on input lines 14–16. AC current is fed through a full wave bridge rectifier 18, thence through an inductive coil 20 and diode 22 to one side of capacitor bank 12. The other side of the capacitor bank and the other side of the bridge rectifier are connected to ground. A shunt line 26 connects the junction of inductor 20 and diode 22 to ground via a switch 28.

Switch 28, which is typically a semiconductor device such as a FET or IGBT, is operable at suitable high speeds, such as for example 24 kilohertz, between on and off or open and closed positions, in response to a pulse generator 30. In this simplified conventional boost regulator, inductor 20 stores energy each time the switch closes, and upon opening of the switch, discharges its stored energy to add an increment of charge to the capacitor storage bank. Charging continues as long as the switch 28 is repetitively cycled on and off. Charging stops when switch cycling stops and the capacitor voltage remains at its charged value, except for leakage that may occur. Capacitor voltage is fed through a control switch 36 (typically an SCR) and a weld transformer 38 to welding electrodes embodied in a conventional weld head 40 that is supplied by weld cables 42 and 44.

The system senses output energy delivered to the weld head and adjusts the capacitor bank voltage to compensate for weld system component changes caused primarily by heating of the system components.

Voltage to the weld head is sensed by leads connected to weld cables 40,42 for providing inputs to a weld voltage sensing amplifier 50, the output of which provides a first input to an analog multiplier 52. Weld current is sensed across a milliohm current sensing resistor 54 in series with one of the weld cables, such as cable 42, and provides inputs to a weld current sensing amplifier 56, of which the output provides a second input to the analog multiplier 52. The latter calculates instantaneous power and provides an output to an analog integrator 58 that calculates total energy based upon measured weld current and measured weld voltage. An output signal from integrator 58 is proportional to delivered output energy and is fed to an analog to digital convertor 60 which provides an input to a computer 62. The latter performs calculations, to be detailed below, that establish capacitor bank voltage for the next weld, based upon measured output energy delivered in the prior weld and a previously determined efficiency coefficient. At the output of the computer on a line 64 appears a signal indicating magnitude of the voltage to be stored in the capacitor bank for use in the next weld. This quantity is represented herein as the next voltage to be stored in the capacitor, $V_{stor-next}$. The voltage on line 64 is fed to a comparator amplifier 66 where it is compared with voltage on the capacitor bank 12 that is fed to the comparator amplifier via a line 68 connected to the capacitor bank.

The output of comparator amplifier 66, which may be either high or low, enables or disables pulse generator 30 so as to continue to charge the capacitor bank voltage until this voltage reaches the computed value provided on line 62, at which point switch 28 is disabled and charging of the capacitor bank stops.

In an alternative configuration, the analog multiplier 52 and integrator 58 may be omitted and the outputs of the two sensing amplifiers 50,56 fed through a multiplexer (not shown) to the analog to digital convertor 60. In this configuration the multiplication and integration for calculation of energy would be performed digitally in computer 12.

In general, the described circuit enables the adjustment of capacitor voltage to account for changes in energy delivered to the weld site that are caused by various factors, and, in particular, by the heating of the welding apparatus components as a series of welds is made. The apparatus and method of this disclosure provide for empirically determining a voltage in the capacitor bank and a measured output energy delivered to the weld site upon the making of an acceptable weld. Utilizing these parameters, a set energy coefficient, $K_{set}$, is established and subsequent useful (non-test) welds are made. During each such subsequent weld, output energy delivered to the weld site is measured and a value for the energy coefficient is calculated. Based upon desired output energy ($Q_{set}$) and the previously established $K_{set}$ or a newly calculated ($K_{last}$) energy coefficient, a new voltage is established for the capacitor bank to be used during the succeeding weld. Accordingly, as the welder components get hot and the distribution of energy from the capacitor bank to the welding site changes, the voltage of the capacitor bank is adjusted for the next weld in such a fashion as to maintain the energy output of the next weld substantially equal to the desired output energy.

The following discussion will help to explain the algorithm employed and the mathematical background of the nature of the stored voltage modification based upon sensed output energy.

Energy $Q_{stor}$ stored in the capacitor bank may be defined as:

$$Q_{stor} = \tfrac{1}{2} * C_w * (V_{stor})^2$$

Output energy is $Q_{out}$ = efficiency * $Q_{stor}$, which is equal to efficiency * $\tfrac{1}{2}$ $C_w$ * $(V_{stor})^2$ = $K$ * $(V_{stor})^2$. Where K is an efficiency coefficient (efficiency * $\tfrac{1}{2}$ * $C_w$) for the system, and $C_w$ is the capacitance of the capacitor bank.

Additional subscripts are used in this analysis to define the particular times at which the term is measured or established. These subscripts are "Set" = set point values, "Last" = last measured values, and "Next" = desired values for the next weld.

Several empirical welds are made employing a selected initial capacitor voltage and adjusting current and voltage until satisfactory welds are obtained. During each weld the energy monitor measures output energy as $Q_{out-last}$.

The operational steps of the algorithm of the method and apparatus disclosed herein are as follows:

1. Charge the capacitor bank. The energy in the capacitor is a consequence of the target voltage, $V_{stor-next}$.

2. Make a weld. Measure the output energy during the weld. Call this energy $Q_{out-last}$.

3. Calculate $K_{last}$ as follows:

$$K_{last} = Q_{out-last} \div (V_{stor-last})^2, \text{ while assuming that}$$
$$V_{stor-last} = V_{stor-next}$$

Certain initial steps are performed for welder setup. During welder setup, a succession of trial welds is made and a series of values for $Q_{out-last}$ and $K_{last}$ are established. At some point in time, the operator will decide that a "best weld" was made and that the last measured values for output energy shall be saved. Thus, the target value, $Q_{set}$, will become the last measurement of $Q_{out-last}$. Also, $K_{set}$ will be the calculated value, $K_{last}$, which was determined after the "best weld". The values of $Q_{set}$ and $K_{set}$ will remain unchanged during subsequent welds until the operator intervenes and establishes a new target values. Effectively, the algorithm maintains the output energy at the target value $Q_{set}$, even though the welder gets hot and efficiency changes.

4. Calculate $V_{stor-next}$ $$V_{stor\text{-}next} = (Q_{set} \div K_x)^{\frac{1}{2}}$$

where:

$K_x$ = $K_{set}$ if this is the first weld after establishment of $K_{set}$.

= $K_{set}$ if the welder has cooled appreciably.

= $K_{last}$ if $K_{last}$ was calculated recently. (Welder is hot)

5. Repeat steps 1, 2, 3, and 4. Thus, while the welder is hot, a new $K_{last}$ is calculated (as in step 3) on the basis of the measured output energy during the last weld, and a new $V_{stor\text{-}next}$ is calculated, as in step 4, using $Q_{set}$ and the new $K_{last}$.

Two operating modes are contemplated for the welder. In the STORED ENERGY mode, a voltage setpoint will be established independently of the output energy. All measurements and calculations will be made, but they will not influence the value for $V_{stor\text{-}next}$. When the operator wishes to declare that a "best weld" has been made, he will press a button labeled EDIT SETPOINT FOR OUTPUT ENERGY. In response, the computer will accept the last values for K and Q as the setpoint values. In practice the operator will also have the additional opportunity to manually adjust these values before proceeding with welding operations in the OUTPUT ENERGY MODE in which the capacitor voltage is modulated by the last measurement for output energy.

The described algorithm monitors and adjusts for changes in the welding system only. However, it is possible for external factors (grease, oxidation or dirt at the welded joint) to reduce current flow and consequently produce a measurement of low energy. If this faulty value for $Q_{out\text{-}last}$ is then used to determine the voltage for the next weld, an error will be propagated into the next and subsequent welds. In order to prevent this problem, a digital, data-smoothing filter may be added in which several past measurements of $Q_{out\text{-}last}$ will be used to determined a "weighted average".

Thus it will be seen that the above described system tends to maintain a constant output energy for all welds by computing new values for capacitor bank storage voltage after each weld.

As previously mentioned, it is desirable not only to change the capacitor bank voltage in accordance with delivered energy of the prior welds, but also to ensure optimum precision of the establishment of the selected capacitor voltage. Such precision regulation can be readily incorporated into the operation of computer 12, but is shown in FIG. 2 in an exemplary circuit that is independent of the energy sensing arrangement of FIG. 1, to facilitate explanation.

Figure 2:
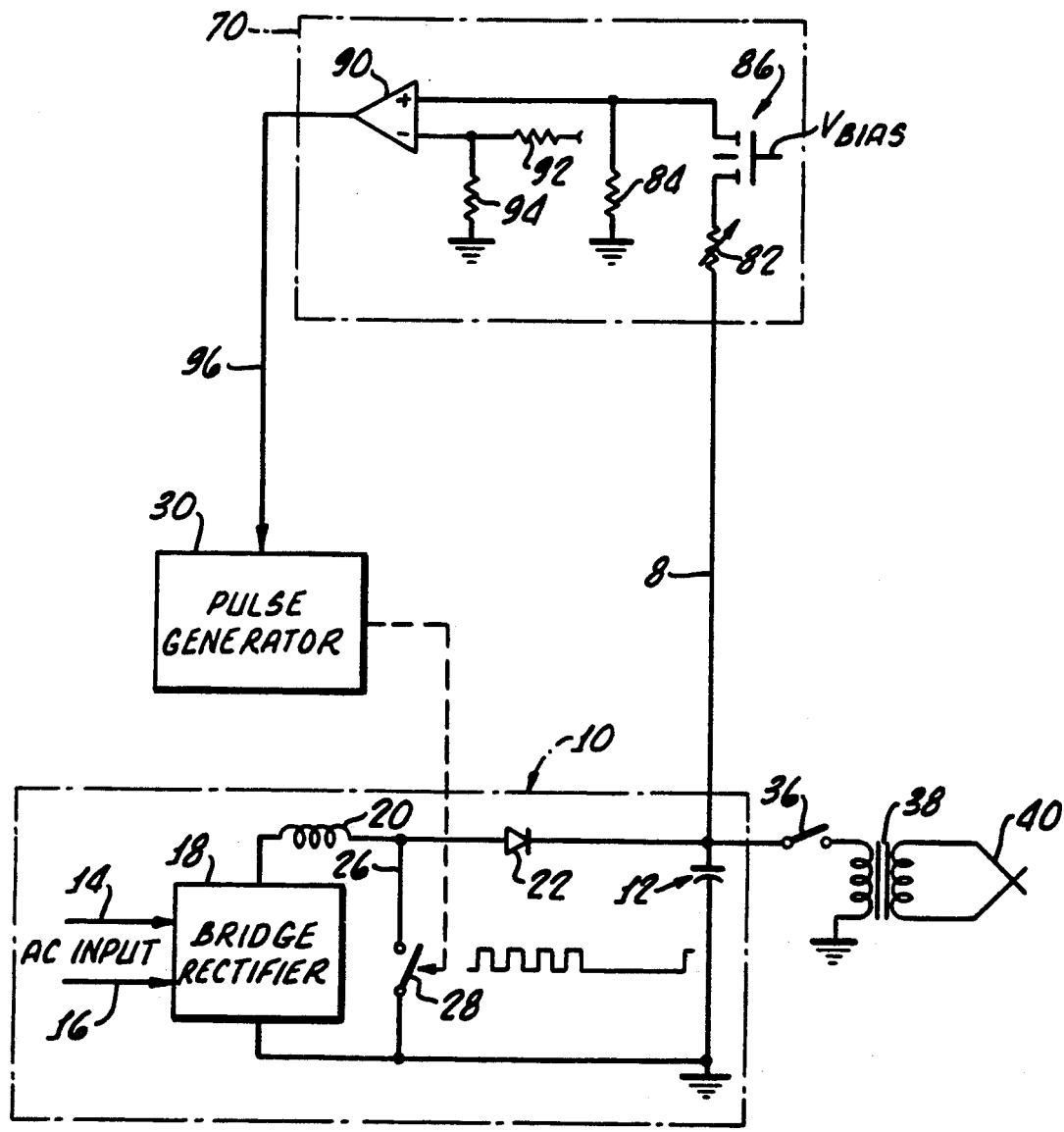
FIG. 2 shown an exemplary circuit for precision regulation of capacitor bank voltage.

A feedback circuit, illustrated in dotted box 70 of FIG. 2 provides for manual adjustment of a voltage selected for storage in capacitor bank 12 and also provides automatic precision regulation of charging of the capacitor.

In this simplified illustration, there is shown a boost regulator 10 that is identical to the boost regulator shown in FIG. 1 and having components thereof identified by the same reference numerals. The capacitor bank 12 provides output energy to the weld head 40 via a switch 36 and transformer 38, as previously described.

For precision regulation of voltage to a predetermined value, feedback circuit 70 receives voltage on the capacitor bank 12 which is transmitted via a line 80 to a voltage divider comprising a variable resistor or potentiometer 82 and a second resistor 84 connected between the potentiometer and ground. A current limiting field effect transistor 86, having a bias voltage on its gate, is interposed in series with the voltage divider, between its resistors 82,84, to protect the potentiometer 82 if it were accidentally set suddenly from maximum to minimum. The field effect transistor is configured to control the voltage across resistor 84 to a maximum of about 5 volts, and thus limit current through resistor 82 to a safe value.

Voltage from the voltage divider is fed to the inverting input of a comparator amplifier 90 having a non-inverting input biased with a small voltage, such as 2 volts DC for example, via a resistor 92 and a ground connected resistor 94, both connected to the non-inverting input of the amplifier. Should the voltage on the output of the amplifier 90 rise to a level where the inverting input (derived from the voltage divider and the capacitor voltage) exceeds the non-inverting reference input, the comparator output switches from a plus voltage to zero volts, to send a signal via a line 96 to shut down the pulse generator 30, and thereby stop charging of the capacitor bank.

The regulating circuit 70 causes the capacitor bank to be charged to a voltage selected by the manually set potentiometer 82 and regulates to that voltage. The arrangement operates to interrupt the charging of the capacitor bank at any selected voltage between about 3 volts to 380 volts. This provides a resolution of about 200 increments per half cycle of the power line voltage when switch 28 is operated at 24 Khz. When the boost regulator or charger is shut off and there is no load connected, and the voltage on the capacitor bank does not change. Eventually capacitor leakage may drop the capacitor bank voltage, at which time the regulating circuit automatically enables the pulse generator 30 to begin charging the capacitor bank, depending upon the hysteresis of the comparator 90.

The drawing illustrates a simplified boost regulator. In an exemplary mechanization, a power factor controller ML4812 made by Micro-Linear Corporation has been employed. This controller is a boost type power factor corrected regulator which provides current to the charging capacitor bank throughout a full 180° of each half cycle of the full wave rectified line voltage, and thus provides for optimum efficiency of energy utilization. Although there are various ways to turn off the ML4812 Micro-Linear power factor corrected controller, the chip employs an input pin labeled "SHUTDOWN", pin 10, which will accept a low level input to turn off the circuit and stop the charging. Thus the charging circuit is shut down and does not simply shunt the power when selected charge magnitude has been attained.

The two drawings show the two concepts of (a) control of capacitor bank voltage for the next weld in accordance with output energy actually delivered during the last weld (FIG. 1), and (b) precision regulation of capacitor voltage by use of a feedback circuit, in separate circuits (FIG. 2). Nevertheless, it will be understood that the two concepts may be used together. Indeed, the computer 12 of FIG. 1, which provides a signal on line 64, effectively performs the additional precision regulation function via the feedback loop that includes differential amplifier 66 and its control of pulse generator 30.

What is claimed is:

1. A method for controlling energy delivered to a weld head from a capacitor bank that stores a weld voltage and is charged by a charging circuit, said method comprising the steps of:

charging the capacitor bank to a first voltage, delivering energy from said capacitor bank to make a first weld, measuring energy delivered during said first weld, calculating a second voltage to be stored for a second weld in accordance with a function of energy delivered during said first weld, charging said capacitor bank to said second voltage, and delivering energy from said capacitor bank to make a second weld.

2. The method of claim 1 wherein said step of calculating comprises computing a value $V_{stor-next}$ of voltage to be stored from the equation $V_{stor-next} = (Q_{set} \div K_{last})$, where $Q_{set}$ is a desired target energy and $K_{last}$ is an efficiency coefficient calculated from the measured energy delivered during the last weld.

3. The method of claim 2 wherein said step of calculating comprises calculating a value of $K_{last}$ from the equation $= K_{last} = Q_{out-last} \div (V_{stor-last})^2$ where $V_{stor-last}$ is voltage stored in said storage device during said first weld.

4. A method of delivering electrical energy to a welding head by welding apparatus that includes a voltage storage device for delivering output energy to the weld head and a charging circuit for establishing a stored voltage in the storage device, said method comprising the steps of:

empirically determining a nominal voltage in said storage device and target energy delivered to a weld site upon making an acceptable weld with said welding apparatus, charging said storage device to said nominal voltage, delivering energy from said storage device to the weld head to make a first subsequent weld, measuring energy delivered to the weld head during said first subsequent weld, and controlling energy delivered to the weld head for making a second subsequent weld in accordance with the magnitude of said measured energy.

5. The method of claim 4 wherein said step of controlling comprises calculating a voltage to be stored in said storage device for a second subsequent weld in accordance with a function of energy measured during said first subsequent weld.

6. The method of claim 5 wherein said step of calculating comprises computing a value of $V_{stor-next}$ of voltage to be stored from the equation $V_{stor-next} = (Q_{set} \div K_{last})^{\frac{1}{2}}$ where $Q_{set}$ is energy measured during said acceptable weld, and $K_{last}$ is an energy coefficient calculated on the basis of energy delivered during said first subsequent weld.

7. The method of claim 6 wherein said step of calculating comprises calculating the value of $K_{last}$ from the equation $K_{last} = Q_{set} \div (V_{stor-last})^2$ where $V_{stor-last}$ is voltage stored in said storage device during said first subsequent weld.

8. The method of claim 4 wherein said voltage storage device comprises a capacitor bank, and wherein said charging circuit comprises means for charging the capacitor bank, said step of controlling energy delivered to the weld head comprising employing measured energy delivered during said first subsequent weld to determine a new charging voltage, and controlling the charging of said capacitor bank to said new charging voltage.

9. The method of claim 8 wherein said capacitor device is charged by a boost regulator, and wherein said step of controlling comprises shutting down said regulator when voltage stored in said capacitor bank reaches said new charging voltage.

10. The method of claim 9 wherein said boost regulator comprises a power factor corrected boost regulator having a repetitively operating switch, and wherein said step of controlling comprises disabling said switch.

11. Welding apparatus comprising:

a weld head, voltage storage means for delivering electrical energy to said weld head, charging means for charging said storage device, means for sensing weld energy delivered to said weld head during a weld, and means responsive to said means for sensing for controlling said charging means in accordance with sensed weld energy delivered to the weld head from the storage device during a previous weld.

12. Welding apparatus comprising:

a weld head, a capacitor storage bank for storing a voltage and delivering weld energy to said weld head, charging circuit means for charging the storage bank, means for establishing a set point voltage, comparison means for comparing the voltage in said storage bank with said set point voltage.

means responsive to said comparison means for shutting down said charging means, and sensing means for generating a sensed energy signal indicative of energy delivered to the weld head during a first weld, compensation means responsive to said sensed energy signal for determining a modified set point voltage for use in making a subsequent weld.

13. The apparatus of claim 12 wherein said charging circuit means comprises a boost regulator, and wherein said means for shutting down said charging means comprises means for disabling said regulator.

14. The apparatus of claim 12 wherein said charging circuit means comprises a power factor corrected boost regulator having a repetitively operating switch, and wherein said means for shutting down said charging means comprises means for disabling said switch.

15. The apparatus of claim 12 wherein said comparison means comprises a comparison circuit having a first reference input and having said voltage in said storage bank as a second input and having an output, said means for shutting down said charging means being responsive to said output.

16. The apparatus of claim 12 wherein said means for establishing a set point voltage comprises a voltage divider connected to an output terminal of said capacitor storage bank, and wherein said comparison means comprises a differential amplifier having a first input connected to a reference potential and having a second input connected to said voltage divider, and having an amplifier output, said charging circuit means having a control input for shutting down said charging circuit means, and means for transmitting said amplifier output to said charging circuit control input.

17. The apparatus of claim 16 circuit wherein said charging circuit means comprises a power factor corrected boost regulator having a repetitively operating switch, and wherein said means for shutting down said charging circuit means comprises means for disabling said switch.

* * * * *